(12) United States Patent
Bobbitt et al.

(10) Patent No.: US 7,093,048 B2
(45) Date of Patent: Aug. 15, 2006

(54) SYSTEM AND METHOD FOR REDUCING INRUSH CURRENT IN A BLADE SERVER

(75) Inventors: Jil M. Bobbitt, Austin, TX (US); Zhan Mei, Round Rock, TX (US); Dung T. Nguyen, Round Rock, TX (US); Jason D. Tunnell, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 319 days.

(21) Appl. No.: 10/411,013

(22) Filed: Apr. 10, 2003

(65) Prior Publication Data
US 2004/0201368 A1    Oct. 14, 2004

(51) Int. Cl.
*H05K 7/00*    (2006.01)

(52) U.S. Cl. .................................................... 710/302
(58) Field of Classification Search ................. 710/302
See application file for complete search history.

(56) References Cited
U.S. PATENT DOCUMENTS

| | | | |
|---|---|---|---|
| 5,572,141 A | 11/1996 | Hutton ........................ | 324/757 |
| 5,712,754 A | 1/1998 | Sides et al. .................. | 361/58 |
| 6,035,358 A | 3/2000 | Tanikawa .................... | 710/102 |
| 6,038,633 A | 3/2000 | Tavallaei .................... | 710/262 |
| 6,041,375 A | 3/2000 | Bass et al. .................. | 710/103 |
| 6,044,424 A | 3/2000 | Amin ......................... | 710/103 |
| 6,108,732 A | 8/2000 | Klein ......................... | 710/103 |
| 6,122,746 A | 9/2000 | Nouri et al. ................. | 713/310 |
| 6,138,195 A | 10/2000 | Bermingham et al. ....... | 710/104 |
| 6,182,173 B1 | 1/2001 | Grosser et al. .............. | 710/103 |
| 6,191,499 B1 | 2/2001 | Severson et al. ............. | 307/31 |
| 6,209,051 B1 | 3/2001 | Hill et al. .................... | 710/103 |
| 6,222,708 B1* | 4/2001 | Severson et al. .............. | 361/2 |
| 6,263,387 B1 | 7/2001 | Chrabaszcz .................. | 710/103 |
| 6,275,958 B1 | 8/2001 | Carpenter et al. ............ | 714/48 |
| 6,282,596 B1 | 8/2001 | Bealkowski et al. ......... | 710/103 |
| 6,286,066 B1 | 9/2001 | Hayes et al. ................. | 710/103 |
| 6,289,467 B1 | 9/2001 | Lewis et al. ................. | 713/340 |
| 6,415,346 B1* | 7/2002 | Mueller et al. .............. | 710/302 |
| 6,449,676 B1 | 9/2002 | Johari et al. ................. | 710/304 |
| 6,515,840 B1 | 2/2003 | Covi et al. ................... | 361/93.1 |
| 6,687,837 B1* | 2/2004 | Beck ........................... | 713/300 |
| 6,785,142 B1* | 8/2004 | Regimbal et al. ............ | 361/727 |
| 2003/0237008 A1* | 12/2003 | Freevot et al. .............. | 713/300 |

OTHER PUBLICATIONS

David Marsh, Hot-swap controllers enable High-availability systems, EDN, Nov. 2002.*

* cited by examiner

*Primary Examiner*—John R. Cottingham
*Assistant Examiner*—Christopher A. Daley
(74) *Attorney, Agent, or Firm*—Baker Botts L.L.P.

(57) ABSTRACT

A system and method for reducing inrush current in an information handling system includes charging a pre-charge circuit with an elongated pin. The information handling system includes a midplane with at least one power source connector and multiple blade connectors able to connect to blade servers. Each blade connector has an elongated pin for supplying power to a blade server. Each blade server has a power connector for receiving the elongated pin and an integrated pre-charge circuit including a resistor and capacitor.

14 Claims, 2 Drawing Sheets

SYSTEM AND METHOD FOR REDUCING INRUSH CURRENT IN A BLADE SERVER

TECHNICAL FIELD

The present disclosure relates in general to information handling systems, and more particularly to a system and method for reducing inrush current in a blade server.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a modular information handling systems such as a multi-blade servers. Multi-blade servers typically include midplanes for attaching multiple blades (sometimes referred to as "bricks"). Midplanes allow the multiple blades to be interconnected in a single chassis and to share a common power source. Each blade typically includes a processor and memory and may store data, process information, or perform particular tasks.

During the operation of a multi-blade server system, a user may need to replace or add a blade to the system. This may be necessary if a blade becomes corrupt or if the user desires to add another blade to the system. To add or remove a blade, a user may shut down the entire system to add the new blade or replace a damaged blade. This method is disadvantageous because a user must take the time to shut down the system and loses the functionality of the other blades while the system is shut down.

A second, and more preferable option for the user would be to "hot-plug" the blade into the server system. That is, to install a new blade while the system is running. Hot-plugging has the advantage that a user does not have to shut down the entire server and lose the functionality of the other blades. However, this option has disadvantages. In server systems, especially large ones able to hold ten or more blades, hot-plugging a blade may result in a large inrush current. This large inrush current may damage circuitry or components within the blade that has been hot plugged. The resulting stress and damage on the blade's circuitry and components may negatively affect performance of the blade and reduce the life of the blade.

The inrush current experienced when hot-plugging a blade is caused by the large power supply of the midplane and the large capacitors on the blade. A multi-blade server system with a large number of blades requires a relatively larger power supply. In order to effectively filter the noise of a larger power supply, blades utilize capacitors. Capacitors are able to effectively filter the noise of the larger power supply; however, large capacitors create hot-plugging problems. When the blade is hot-plugged in, the blade immediately absorbs a large inrush of current to fill its large capacitor. This large inrush of current may stress and damage the blade.

In order to reduce inrush current, previous solutions have focused on reducing the size of the blade's capacitors. Although this effectively reduces the inrush current on the blade, this also reduces the effectiveness of filtering noise because a smaller capacitor cannot buffer the fluctuation of electrical current as well as a larger capacitor.

SUMMARY

Therefore, a need has arisen for a system and method which reduces problems associated with inrush current when hot-plugging a blade to a midplane.

A further need exists for a system and method to reduce inrush current without reducing the bulk capacitance of a blade component.

In accordance with the teachings of the present disclosure, a system and method to reduce inrush current in an information handling system is provided that substantially reduces disadvantages and problems associated with previously developed systems and methods to reduce inrush current. A connector with an elongated pin for supplying power to a blade is provided. Also, a pre-charge circuit including a power resistor and a capacitor is disposed on the blade. In operation, the elongated pin contacts with the blade and acts to charge the pre-charge circuit.

In one aspect, an information handling system is disclosed that includes a midplane that includes a power source and multiple blade connectors. The blade connectors include an elongated pin for supplying power to the blade. The blade has an integrated pre-charge circuit that includes a power resistor and a capacitor. More specifically, the elongated pin is formed to contact the blade before the other pins contact, thereby pre-charging the blade's capacitors. More particularly, the power resistor may be sized according to the voltage output of the power source.

In another aspect of the present disclosure, a method to reduce inrush current in a multi-blade server includes providing a blade connector with an elongated pin for transferring power and additional, shorter pins for transferring data and power. The method also includes providing power to the blade connector and a blade server with a pre-charge circuit. The blade connector and blade server are arranged in a first position such that the elongated pin contacts and charges the pre-charge circuit. The blade connector and blade server are next moved into a second position such that the remaining pins interface with the blade server.

The present invention provides a number of important technical advantages. One technical advantage is providing a connector with an elongated pin and a pre-charge circuit. The elongated pin and pre-charge circuit allows the blade to pre-charge and prevents problems associated with blades absorbing large amounts of inrush current during hot-plug operations.

Other technical advantages will be readily apparent to those skilled in the art from the following FIGURES, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to the figures, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
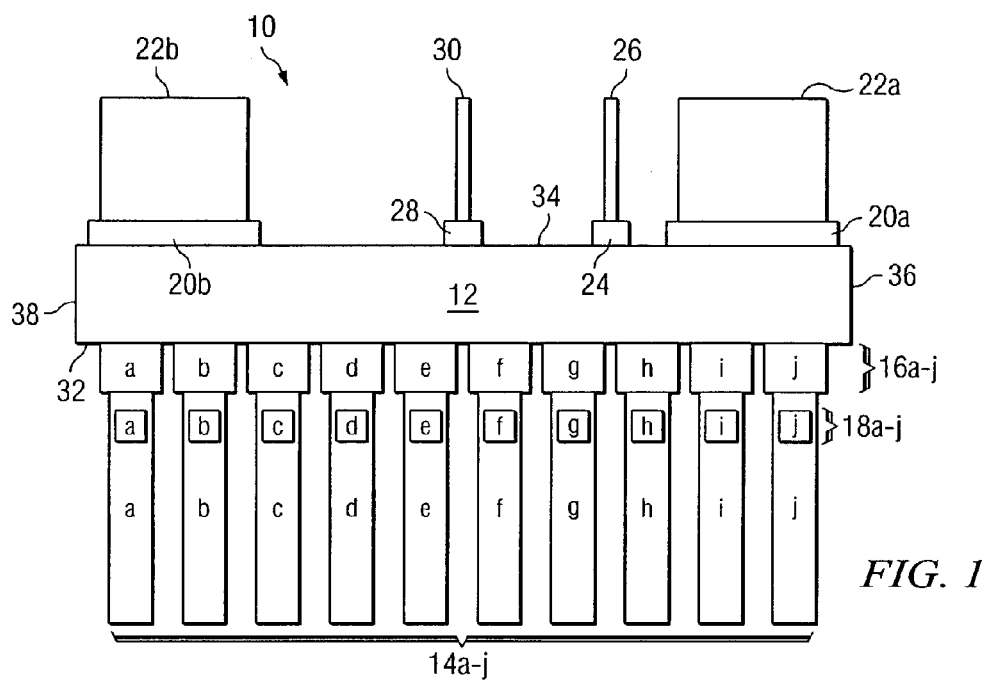
FIG. 1 illustrates a modular information handling system.

FIG. 1 illustrates a modular information handling system including midplane 12 and blade servers 14a–j. Blade servers 14 may also be referred to as "brick servers" or modular servers. In the present embodiment, midplane 12 is a circuit board and that includes blade connectors 16a–j, power source connectors 20a and 20b, power supplies 22a and 22b, management card connector 24, management card 26, Network Interface Card (NIC) connector 28, and NIC 30.

Midplane 12 allows blade servers 14a–j to be interconnected and to share power resources 22a and 22b and to share other resources such as NIC 30 and management card 26. Midplane 12 may hold up to ten blade servers 14a–j. In alternate embodiments, midplane 12 may hold more or less than ten server blades 14. System administrators may easily increase or decrease the processor density of midplane 12 by adding or removing blade servers 14 to midplane 12.

Blade connectors 16a–j are associated with midplane 12. Blade connectors 16a–j provide an interface between blade servers 14a–j and midplane 12 where each blade connector 16 accepts one blade server 14. Blade connectors 16a–j allow midplane 12 to accept up to ten blade servers 14a–j in the embodiment shown in FIG. 1. Midplane 12 does not require all ten blade connectors 18a–j to have a blade server 14a–j installed for proper functionality—one server blade 14a installed in one connector 16a is sufficient for proper functionality of both midplane 12 and server blade 14a.

Power source connectors 20a and 20b allow Midplane 12 to be connected to a power supply. Although two power connectors are shown, other embodiments may include only a single power connector or more than two power connectors.

Power supplies 22a and 22b are associated with midplane 12 through power source connectors 20a and 20b. Power supplies 22a and 22b provide power for midplane 12, blade servers 14a–j, management card 26 and NIC 30. Power supplies 22a and 22b are of the appropriate power rating to provide load-balancing for blade servers 14a–j. Additionally, power supplies 22a and 22b are selected to provide sufficient power to satisfy the steady-state load requirements of the ten blade servers 14a–j operating simultaneously. In alternate embodiments, there may be one power supply 22a or more than two power supplies 22a and 22b to provide additional functionality such as power supply redundancy. In one embodiment, the total power supply comprises an approximately one thousand Watt (1,000 W) power supply.

Power supplies 22a and 22b may provide AC/DC current, DC current or VCC current to the midplane and other components. In a preferred embodiment, DC or VCC current is provided to midplane 12 and blade servers 14a–j.

Management card connector 24 may act as a port for management card 26 to interface with midplane 12. This allows midplane 12 to have the capability to manage its server resources and for associated blade servers 18a–j to share a common network management card.

Management card 26 is associated with midplane 12 through management card connector 24. Management card 26 may include a processor operable to manage the resources of modular information handling system 10.

Network Interface Card (NIC) connector 28 may be a port operable to receive NIC 30. NIC connector 28 allows midplane 12 to have network capabilities. NIC 30 is associated to midplane 12 through NIC connector 28. NIC 30 may be operable to provide information handling system 10 with the ability to function and communicate with other information handling systems in a network.

Midplane 12 may also include other network components such as connectors, resistors and cooling systems to provide greater functionality to midplane 12. These components may be removable or replaceable from midplane 12. Midplane 12 and all of the components of modular information handling system 10 are all preferably housed in a single housing or chassis (not expressly shown). In alternate embodiments, midplane 14 may include passive components as well as active components such as integrated circuits or logic circuits.

Midplane 12 is illustrated as having ten blade connectors 16a–j and ten blade servers 14a–j on side 32. Power connectors 20a and 20b, power supplies 22a and 22b, NIC connector 28, NIC 30, management card connector 24 and management card 26 are illustrated on side 34. However, in alternate embodiments, midplane 12 may be configured to accept components on any side 32, 34, 36 and 38. Accepting blade servers 14a–j or power supply 22a on side 32 or side 34 of midplane 12 allows for information handling system 10 to have a flexible modular design to meet a user's preference since midplane 12 may be configured to accept the components such as blades servers 14a–j and power supply 22a on any side of midplane 12.

In the present embodiment, each blade server 14a–j is an independent server able to act independently of the other blade servers 14a–j. Blade servers 14a–j may be a thin, ultra-dense, modular electronic circuit board containing one or more processors. Blade servers 14a–j may also include network functionality and storage capabilities such as memory. In addition to a processor and memory, blade server 14a–j may also include resistors, switches and integrated circuits such as a complex programmable logic devices.

Blade servers 14a–j include power connectors 18a–j. Power connectors 18a–j allow for power to connect between blade connectors 16a–j on midplane 12 and blade servers 14a–j. Power connectors 18a–j include a pre-charge circuit. The pre-charge circuit is described in greater detail in FIG. 2. In a preferred embodiment, power connectors 18a–j are integrated on each blade server 14a–j.

A user inserts blade servers 14a–j into blade connectors 16a–j on midplane 12. To install blade server 14a on midplane 12, the user selects which blade connector 16a–j on midplane 12 on which to install blade server 14a. Each connector 16a–j on midplane 12 may receive one blade server 14a–j. For example, a user may install server blade 14a into blade connector 14a, server blade 16b into blade connector 16b, and server blade 14j into blade connector 16j. Preferably, a user may install a blade server 14 into any available blade connectors 16a–j. Information handling system 10 functions properly whether only one blade server 14a is installed, if all blade servers 14a–j are installed, if only a portion of server blades 14a–j are installed and some blade connectors 16a–j are open.

Information handling system 10 utilizes a high-speed bus to interconnect blade servers 14a–j, blade connectors 16a–j, midplane 12, power supplies 22a and 22b, management card 26 and NIC 30. Blade servers 14 preferably maintain fast and fault tolerant communications at high speeds with each other, power supply 22a and 22b, management card 26, and NIC 30 via midplane 12.

Figure 2:
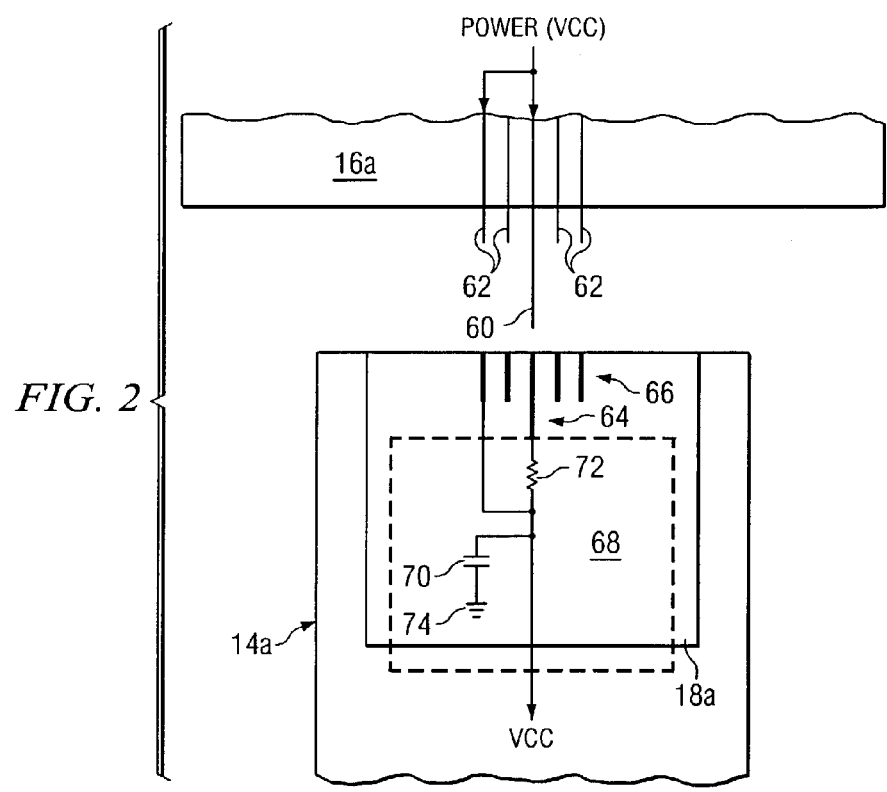
FIG. 2 illustrates a blade connector with an elongated pin and a blade server with a pre-charge circuit.

FIG. 2 illustrates a blade connector 16a and a blade server 14a with a pre-charge circuit, depicted generally at 68, according to the teachings of the present invention. Blade connector 16a provides power to blade server 14a through power connector 18a.

Blade connector 16a may include a plurality of pins 62 operable to provide power and communicate data to blade server 14a. Pins 62 are generally parallel to one another and extend perpendicularly from the exposed side edge of blade connector 16a. At least one of pins 62 is operable to provide power to blade server 14a.

Each blade connector 16a–j includes an elongated pin 60 for providing power to blade server 14a. Elongated pin 60 is generally parallel to pins 62 and is preferably made of the same material as pins 62.

Blade server 14a includes power connector 18a. Power connector 18a includes a plurality of mating connectors 64 and 66 and pre-charge circuit 68. Mating connectors 64 and 66 are formed to physically receive pins 60 and 61 and are able to receive data and power from pins 60 and 62 and to transmit data from blade server 14a. In the present embodiment, mating connector 64 is deeper than mating connectors 66 in order to receive elongated pin 60.

In a preferred embodiment, pins 62 are shorter than elongated pin 60 so that elongated pin 60 contacts mating connector 64 before the plurality of pins 62 contact the plurality of mating connectors 66.

Power connector 18a includes an integrated pre-charge circuit 68. Pre-charge circuit 68 is in operative communication with power connector 18a, mating connectors 64 and 66 and blade server 14a. Pre-charge circuit 68 includes power resistor 72, capacitor 70 and grounding unit 74.

Power resistor 72 is associated with mating connector 64 and operates to resist, regulate or limit the flow of electrical current into blade server 14a. In a preferred embodiment, power resistor 72 is sized according to the anticipated voltage output of power connector 18a. In one embodiment, power connector 18a includes an input voltage of approximately 12 volts and power resistor 72 includes a resistance of approximately 150 ohms. In a further embodiment, power connector 18a includes an input voltage of approximately 5 volts and power resistor 72 includes a resistance of approximately 68 ohms. In an additional embodiment, power connector 18a includes an input voltage of approximately 3.3 volts and power resistor 72 includes a resistance of approximately 47 ohms.

Capacitor 70 is associated with power resistor 72 and grounding unit 74. Capacitor 70 holds charge in the form of an electrostatic field and provides a filtering system to pre-charge circuit 68 of blade server 14a. Capacitor 70 is preferably constructed of a dielectric material. In a preferred embodiment, capacitor 70 has a capacitance of approximately 10 farads. In another embodiment, the capacity of capacitor 70 is sized according to the output voltage capacity of power connector 18a or the expected voltage supplied from the elongated pin. In the illustrated embodiment, only one capacitor 70 is shown; alternate embodiments may include two or more capacitors 70. Grounding unit 74 is associated with capacitor 70. Grounding unit 74 dissipates excess electrical current that cannot be absorbed by capacitor 70.

Blade connector 16a and pre-charge circuit 68 reduce inrush current into blade server 14a. Midplane 12 supplies power to blade connector 16a via pins 62 and elongated pin 60. Blade server 14a is placed in a first position such that only elongated pin 60 contacts a power receiving portion of power connector 18a. In the illustrated embodiment elongated pin 60 contacts mating connector 64. Upon contact between elongated pin 60 and mating connector 64, pre-charge circuit 68 is charged. Typically a large inrush current occurs when hot-plugging blade server 14a because the large uncharged capacitors of blade server 14a quickly absorb large amounts of electrical current from midplane 12. This inrush of current causes stress and damage on the internal circuits. In this invention, elongated pin 60 first contacts pre-charge circuit 68. The large inrush of current is prevented by power resistor 72, which control limits the amount of electrical current able to pass to capacitor 70.

Next, blade server 14a is placed in a second position such that all of the remaining pins 62 contact respective mating connectors 66. These pins are able to transfer data and power. At least one pin 62 transfers power and bypasses power resistor 72. When all of the pins 60 and 62 of midplane 12 interface with the power connector 18a, blade server 14a preferably becomes fully operable. Because pre-charge circuit 68 has already charged or partially charged capacitor 70, capacitor 70 does not create as large an inrush current to fill the rest of its capacity. Therefore, this method reduces the inrush current experience when hot-plugging a blade into a midplane. A user does not need to pause between installing blade server 14a in the first and second position. The brief amount of time that elongated pin 60 contacts pre-charge circuit 68 before the rest of pins 62 make contact is sufficient to pre-charge the circuit.

Figure 3:
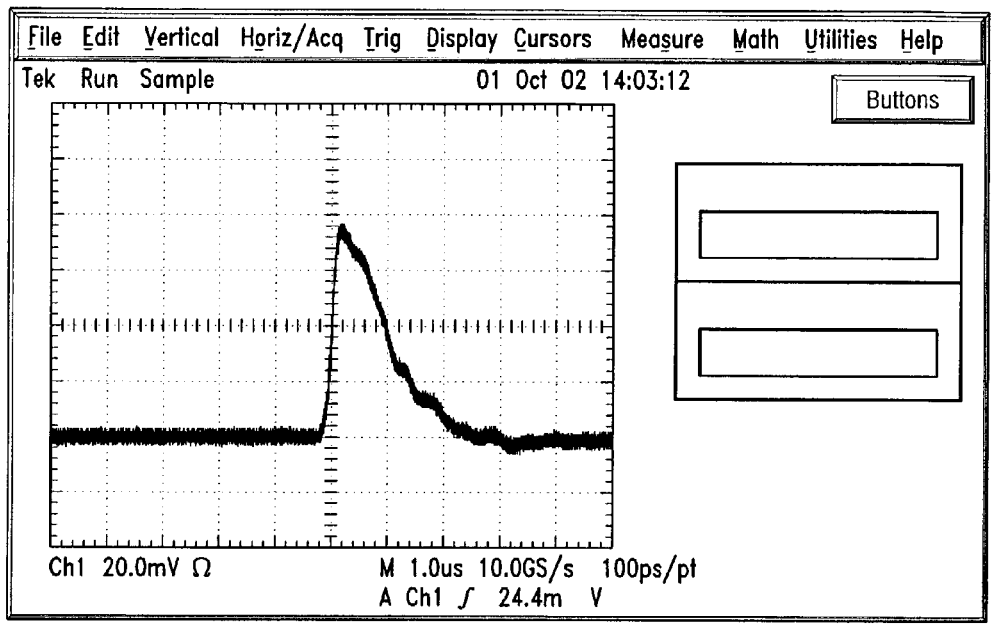
FIG. 3 illustrates the inrush flow of current in a blade server without a pre-charge circuit.
Figure 4:
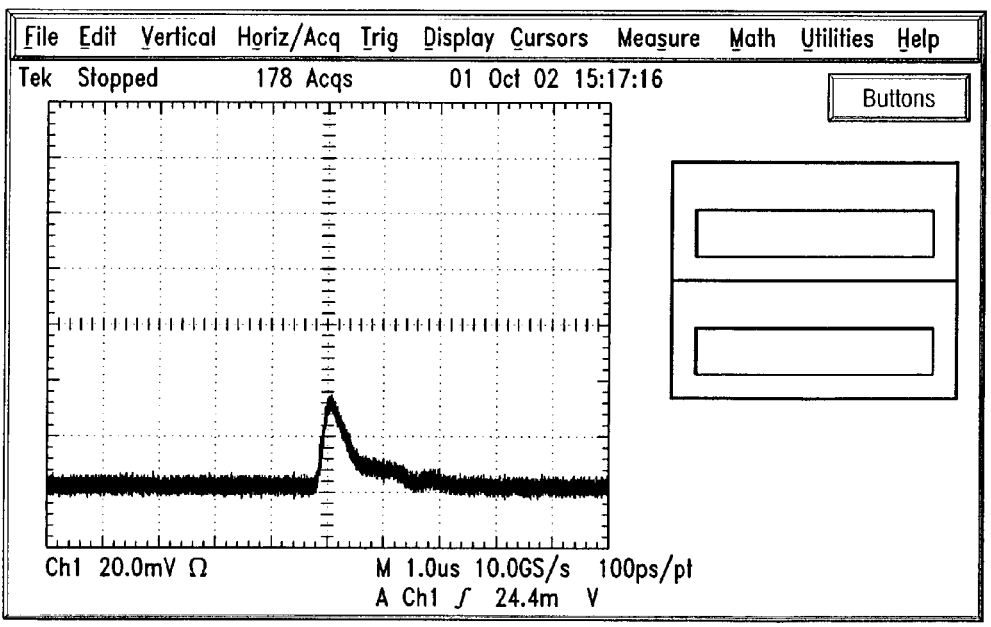
FIG. 4 illustrates the inrush flow of current in a blade server utilizing a pre-charge circuit according to the present disclosure.

FIGS. 3 and 4 illustrate the reduction in inrush current by using an integrated pre-charge circuit. FIG. 3 illustrates the inrush flow of current in a blade server without a pre-charge circuit. The large inrush spike of electrical current occurs because the capacitor 70 on blade server 14a absorbs a relatively large electrical current upon contact with midplane 12. FIG. 3 illustrates an embodiment in which power connector 18a has an input voltage of 12 volts. Here the inrush current spikes at approximately 19 amperes and lasts for approximately 30 milliseconds.

FIG. 4 illustrates the inrush flow of current in a blade server with a pre-charge circuit according to the present disclosure. Like FIG. 3, power connector 18a has an input voltage of 12 volts. Here the inrush current spikes at approximately 9 amperes and lasts for approximately 20 milliseconds. FIG. 4 demonstrates a reduction in both the intensity and duration of the inrush current.

Although the disclosed embodiments have been described in detail, it should be understood that various changes, substitutions and alterations can be made to the embodiments without departing from their spirit and scope.

What is claimed is:

1. An information handling system comprising:
    a midplane having a plurality of blade connectors, each blade connector operable to interface with a blade server;
    the midplane further having at least one power source connector;
    each blade connector having an elongated pin for supplying power to an associated blade server and a plurality of pins having a length shorter than the elongated pin;
    at least one blade server having a power connector for receiving the elongated pin and an integrated pre-charge circuit comprising a power resistor and a capacitor, the pre-charge circuit in operative communication with the power connector; and
    the elongated pin provided such that the elongated pin contacts the power connector before the plurality of pins contacts a plurality of mating connectors on the blade server during a hot-plug installation of the blade server.

2. The information handling system of claim 1, further comprising a power source, the power source associated with the at least one power source connector.

3. The information handling system of claim 1, further comprising a network interface card connector and a network interface card;
    the network interface card connector associated with the midplane and operable to receive the network interface card; and
    the network interface card associated with the network interface card connector and operable to allow the information handling system to communicate with a network.

4. The information handling system of claim 1 further comprising a management card connector and a management card;
    the management card connector associated with the midplane and operable to receive the management card; and
    the management card associated with the management card connector and operable to manage the information handling system.

5. The information handling system of claim 1 wherein the power resistor is sized according to the anticipated voltage output of the power connector.

6. The information handling system of claim 1 wherein the capacitor has a capacitance of approximately 10 farads.

7. The information handling system of claim 1 wherein the power supply comprises an approximately 1,000 Watt power supply.

8. The information handling system of claim 5 wherein the power connector has an input voltage of approximately 12 volts and the power resistor having a resistance of approximately 150 ohms.

9. The information handling system of claim 5 wherein the power connector has an input voltage of approximately 5 volts and the power resistor having a resistance of approximately 68 ohms.

10. The information handling system of claim 5 wherein the power connector has an input voltage of approximately 3.3 volts and the power resistor having a resistance of approximately 47 ohms.

11. An integrated pre-charge circuit for a blade server comprising:
    a pin connector having a power connector operable to receive a midplane blade connector having an elongated pin, and a plurality of pins having a length shorter than the elongated pin, the elongated pin associated with a midplane blade connector and operable to supply power at an anticipated voltage to the pre-charge circuit, the elongated pin provided such that the elongated pin contacts the pin connector before the plurality of pins contacts a plurality of mating connectors on the blade server during a hot-plug installation of the blade server;
    a power resistor associated with the power connector, the power resistor sized based upon the anticipated voltage; and
    a capacitor associated with the power resistor operable to filter the power received by the power connector.

12. The system of claim 11, further comprising the capacitor associated with a grounding unit.

13. The system of claim 11 wherein the power resistor is sized according to the anticipated output voltage of the power connector.

14. The system of claim 11 wherein the capacitor is sized according to the output voltage of the power connector.

* * * * *